United States Patent
Li

(10) Patent No.: US 7,712,015 B1
(45) Date of Patent: *May 4, 2010

(54) APPARATUS AND METHOD FOR SEPARATING CORRUPTED DATA FROM NON-CORRUPTED DATA WITHIN A PACKET

(75) Inventor: Sheng Li, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 832 days.

This patent is subject to a terminal disclaimer.

(21) Appl. No.: 11/388,259

(22) Filed: Mar. 24, 2006

Related U.S. Application Data

(63) Continuation of application No. 09/909,624, filed on Jul. 19, 2001, now Pat. No. 7,043,677.

(51) Int. Cl.
*H03M 13/00* (2006.01)
(52) U.S. Cl. .................. 714/807; 714/758; 714/781
(58) Field of Classification Search ............ 714/748, 714/758, 807, 781
See application file for complete search history.

(56) References Cited

U.S. PATENT DOCUMENTS

| | | | | |
|---|---|---|---|---|
| 5,701,316 A | | 12/1997 | Alferness et al. | |
| 5,832,235 A | * | 11/1998 | Wilkes | 709/247 |
| 5,844,918 A | * | 12/1998 | Kato | 714/751 |
| 6,052,819 A | * | 4/2000 | Barker et al. | 714/776 |
| 6,279,140 B1 | * | 8/2001 | Slane | 714/807 |
| 6,324,670 B1 | | 11/2001 | Henrickson | |
| 6,373,952 B2 | * | 4/2002 | Asano et al. | 380/278 |
| 6,389,550 B1 | * | 5/2002 | Carter | 714/1 |
| 6,609,224 B1 | | 8/2003 | Jonsson | |
| 6,728,920 B1 | * | 4/2004 | Ebersman | 714/752 |

OTHER PUBLICATIONS

Andrew S. Tanenbaum; Computer Networks, Third Edition; Prentice Hall PTR; Chapter 1, 56 pages; Amsterdam, Netherlands.

* cited by examiner

*Primary Examiner*—Esaw T Abraham
(74) *Attorney, Agent, or Firm*—Cesari and McKenna, LLP

(57) ABSTRACT

A method and apparatus for detecting errors and improving quality in real-time data transmissions is provided. In one embodiment, the packet header checksum field is turned off to allow uninterrupted transmission of data packet payloads. A checksum added to each independent data segment in the datagram payload permits each data packet to be examined separately, resulting in improved transmission quality.

16 Claims, 5 Drawing Sheets

APPARATUS AND METHOD FOR SEPARATING CORRUPTED DATA FROM NON-CORRUPTED DATA WITHIN A PACKET

CROSS-REFERENCE TO RELATED APPLICATIONS

This is a Continuation application of, and claims priority to, Ser. No. 09/909,624 filed on Jul. 19, 2001 now U.S. Pat. No. 7,043,677, which has been allowed.

BACKGROUND OF THE INVENTION

1. Field of the Invention

The present invention relates to transport protocols used in delivering real-time multimedia data such as audio and video data.

2. Art Background

The User Datagram Protocol (UDP) is a transport layer protocol commonly used in delivering real-time multimedia data such as audio and video data. Each data packet contains a UDP header and a payload. The UDP header contains a checksum field designed to protect the integrity of the entire data payload. Unfortunately, when an error is detected, the entire payload may be tossed out. If the data payload in the UDP packet contains multiple independent data segments, the undamaged segments will be tossed out as well. This either will increase network congestion by causing the sending device to resend the lost data, or will decrease the quality of the multimedia presentation since the lost data creates noticeable gaps in audio and/or video transmission.

SUMMARY OF THE INVENTION

A method and apparatus for detecting errors and improving quality in real-time data transmissions is provided. In one embodiment, the packet header checksum field is turned off to allow uninterrupted transmission of data packet payloads. A checksum added to each independent data segment in the datagram payload permits each data packet to be examined separately, resulting in improved transmission quality.

BRIEF DESCRIPTION OF THE DRAWINGS

The objects, features and advantages of the present invention will be apparent from the following detailed description in which.

DETAILED DESCRIPTION

The User Datagram Protocol ("UDP") is used in place of the transport layer of the network stack when reliable data delivery is not required. UDP is frequently used to transmit real-time audio and video where lost or corrupted packets are simply discarded (e.g., because there is no time to retransmit). UDP and TCP are both transport layer protocols.

UDP typically employs a checksum to ensure data integrity. As is known in the art, a checksum is generated by calculating the sum of the binary values in a block of data. The checksum is then transmitted with the underlying data. If the checksum indicates that a UDP packet (commonly referred to as a UDP "datagram") contains corrupt data at the receiving end (e.g., at the client computer), the entire packet is simply discarded, with no further action being taken. Unfortunately, discarded packets may be comprised of a plurality of independent data segments, many of which may not be corrupt. As such, discarding an entire packet is an inefficient way to deal with the problem of lost or corrupt data. Moreover, if the data is audio and/or video content, discarding multiple data segments in this manner may result in noticeably degraded audio/video playback at the client.

Figure 1:
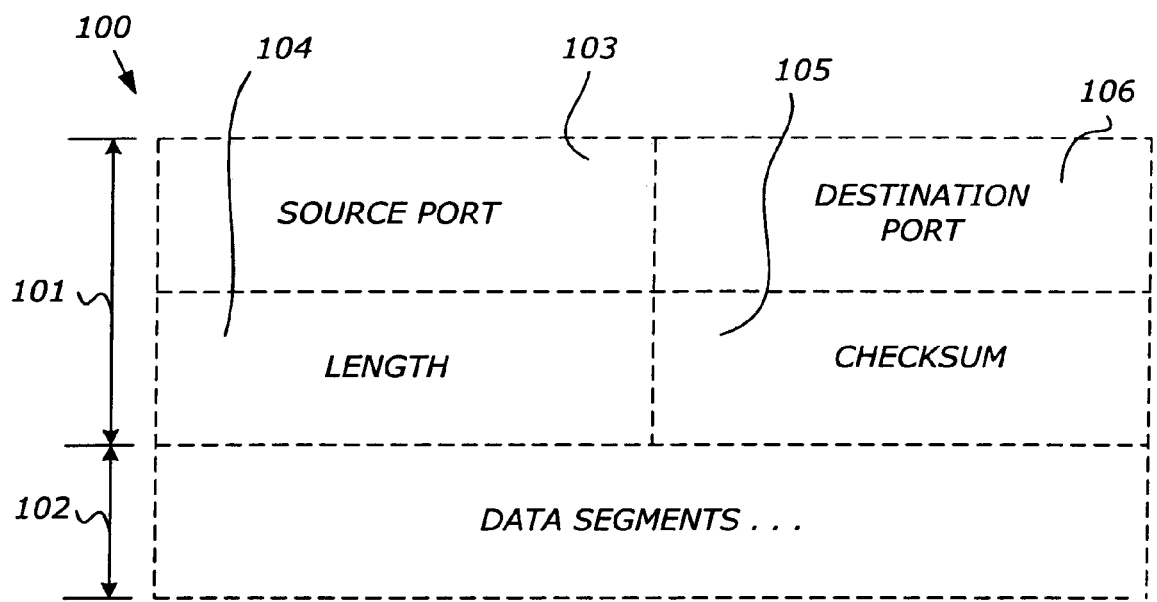
FIG. 1 is a diagram of a User Datagram Protocol (UDP) header field common in the art.

FIG. 1 is a diagram of a datagram 100 commonly used in the prior art. Datagram 100 consists of a header 101 and a data payload 102. Header 101 consists of a source port field 103, a destination port field 106, a length field 104 of the datagram 100, including header 101 and data payload 102, and a checksum 105. Data payload 102 consists of a plurality of independent data segments. Source port field 103 is an optional field. When meaningful it indicates the port of the sending process, and may be assumed to be the port to which a reply should be addressed in the absence of any other information. If not used a value of zero is inserted. Destination Port Field 106 has a meaning within the context of a particular Internet destination address. Length Field 104 specifies the length in octets of the user datagram, including the header and the data. Checksum 105 is the 16-bit one's complement of the one's complement sum of a pseudo header of information from the IP header, the UDP header, and the data, padded with zero octets at the end (if necessary) to make a multiple of two octets. The psuedo header conceptually prefixed to the UDP header contains the source address, the destination address, the protocol, and the UDP length. The checksum used for UDP packets is the same as used for TCP packets.

Figure 2:
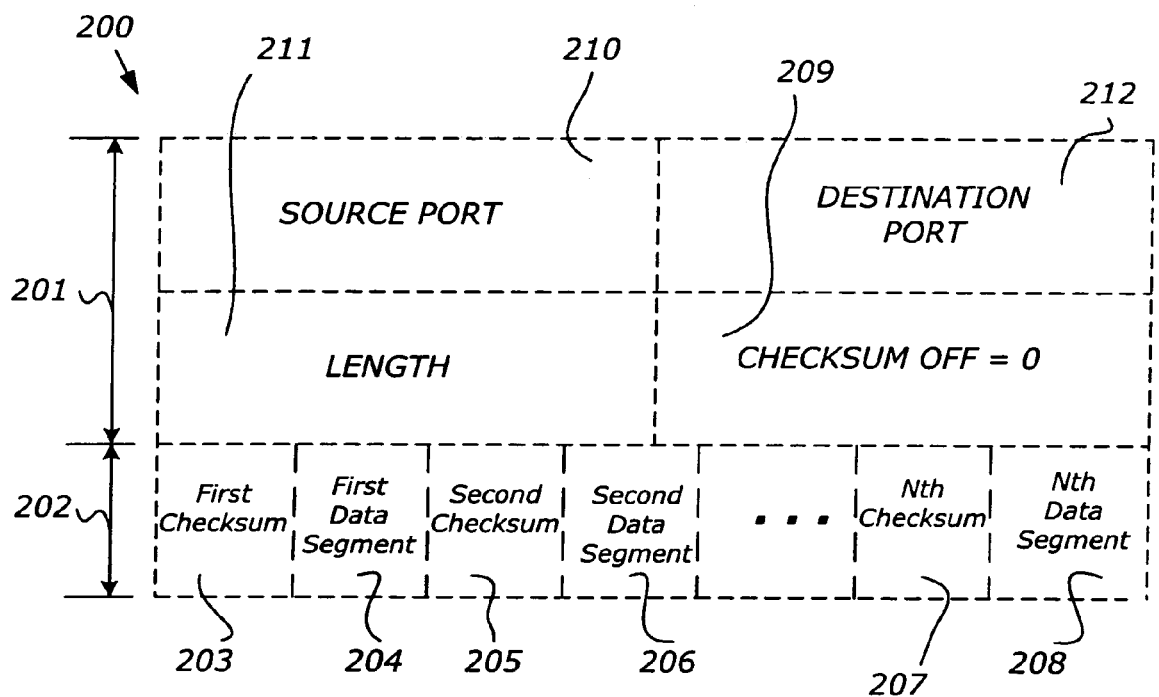
FIG. 2 is a diagram of a datagram provided by one embodiment of the present invention.

FIG. 2 illustrates a UDP datagram 200 employed in one embodiment of the invention. Datagram 200 consists of a header 201 and a payload 202. The header 201 may contain a source port field 210, a destination port field 212, and a length field 211. In this embodiment, the checksum field 209 has been set to zero, and a plurality of independent checksums 203, 205, and 207 have been calculated for a corresponding plurality of data segments 204, 206, and 208, respectively. Setting the UDP checksum field 209 to zero effectively turns off the checksum functionality, thereby ensuring that all data segments 204, 206, and 208 within the UDP packet are transmitted through the transport layer to the application layer or other networking layer defined above the transport layer. At the application layer or other networking layer, the checksum for each data segment is independently validated, and only those individual data segments which are invalid are discarded.

Providing checksums for data segments encapsulated within transport layer data payloads provides a significantly more efficient way to transmit data, particularly when large packet sizes are defined at the transport layer (i.e., because more data segments may be encapsulated within larger transport packets). With respect to audio/video streams, this results in improved real-time streaming of audio and video data, because only corrupt data segments are discarded.

Figure 3:
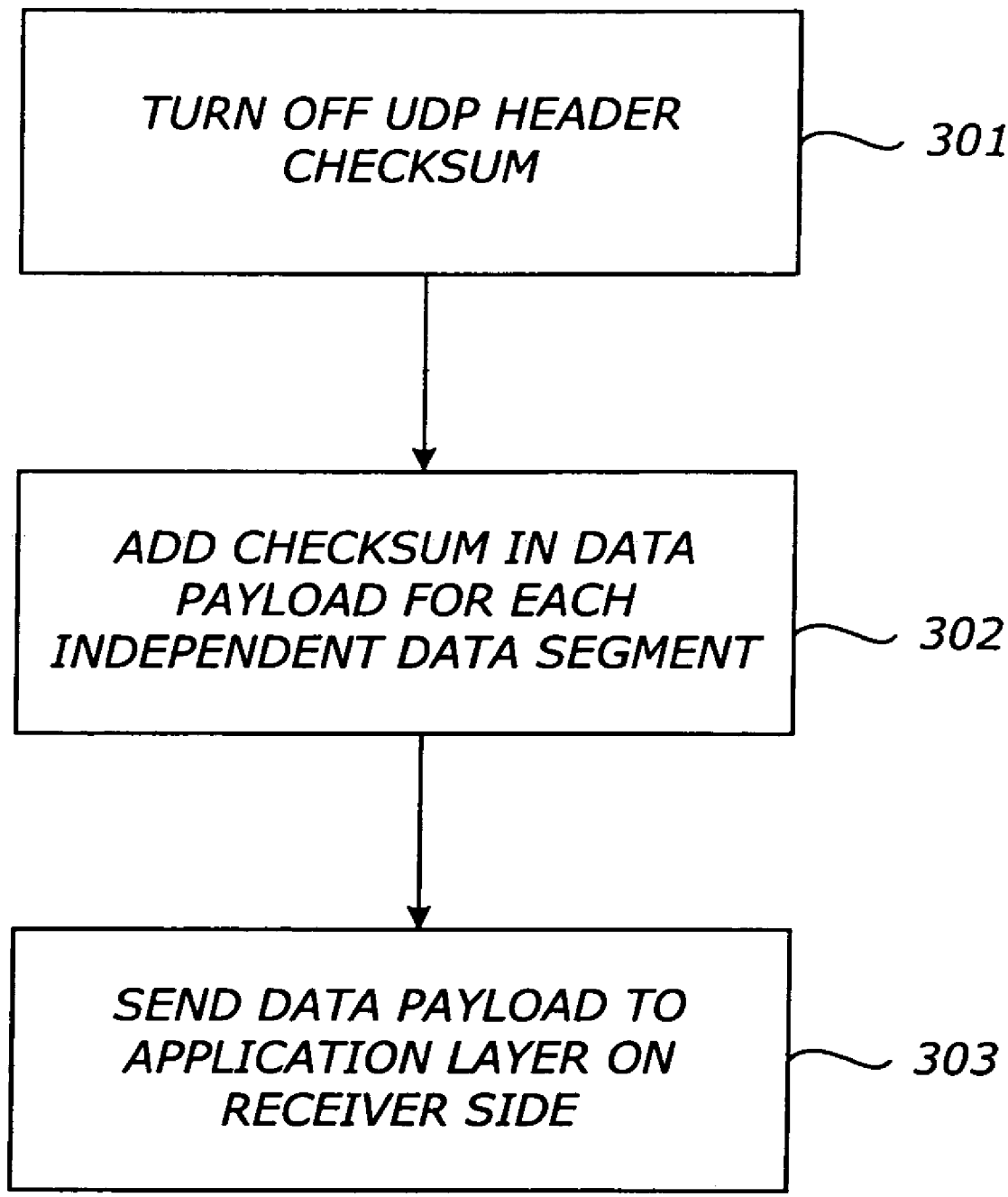
FIG. 3 is a flowchart illustrating one method performed by one embodiment of the present invention.

FIG. 3 illustrates a method according to one embodiment of the invention. At Block 301, the UDP header checksum is turned off by setting the checksum value to zero. At Block 302, a checksum is calculated and added to the data payload for each independent data segment. Independent data segments of various sizes and types may be used while still complying with the underlying principles of the invention. At Block 303, the entire data payload is sent to the application layer or other networking layer above the transport layer on the receiver side.

Figure 4:
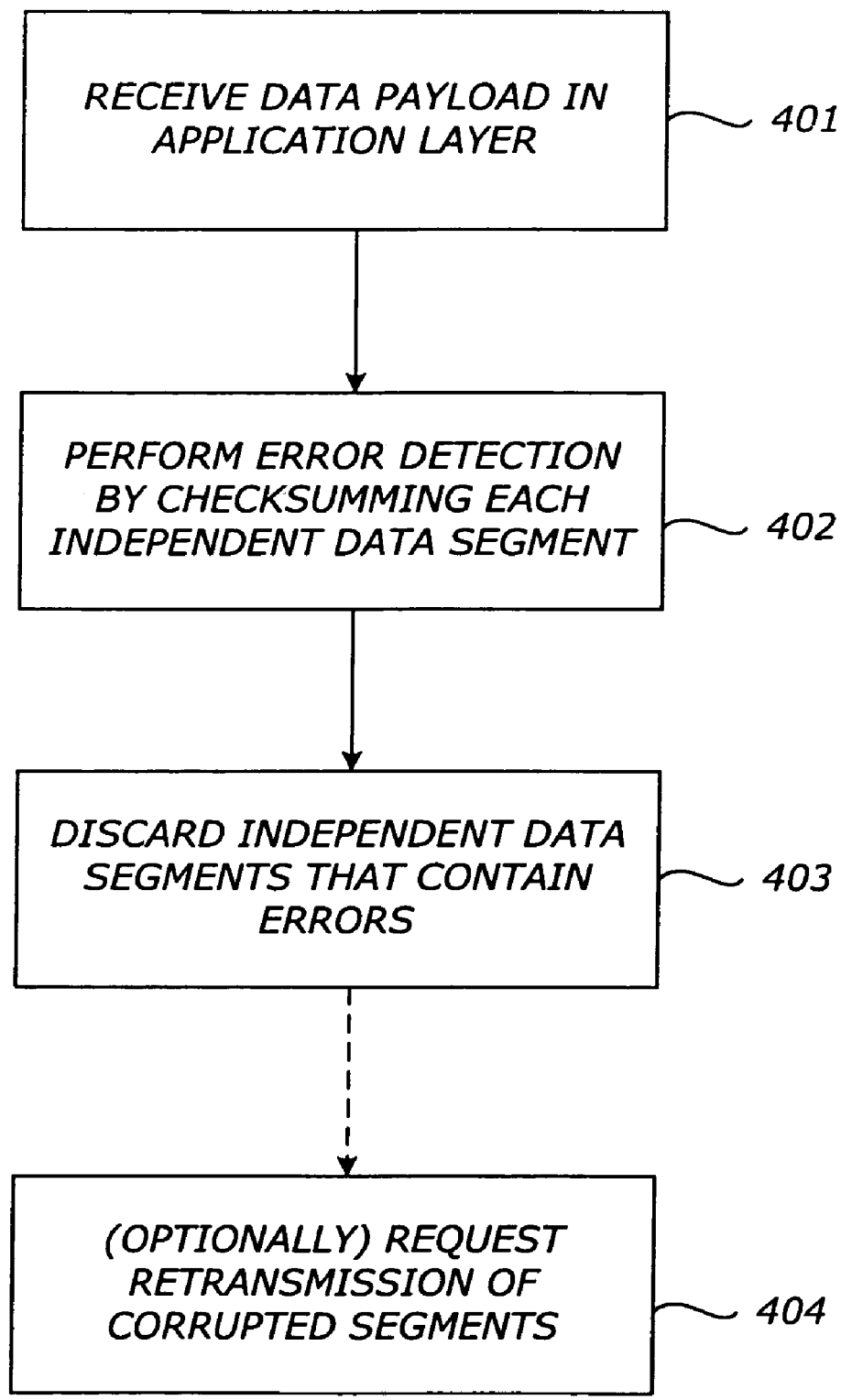
FIG. 4 is a flowchart illustrating another method performed by one embodiment of the present invention.

FIG. 4 illustrates a method according to another embodiment of the invention. At block 401, the data payload is received by the application layer (or other layer defined above the transport layer) on the receiving device. Error detection is performed at Block 402 by calculating checksums for each of the independent data segments and comparing the calculated checksums to the checksums transmitted with the data segments. If the checksums match, then the data is presumed to be accurate. If, however, the checksums do not match, then the data is presumed to be corrupt. Independent data segments containing corrupt data are discarded at Block 403. Optionally, retransmission of these data segments may be requested at Block 404.

In one particular embodiment of the invention, GSM-AMR audio frames are individually assigned checksums and encapsulated within UDP datagrams. GSM is short for Global System for Mobile Communications, and is one of the leading digital cellular standards. If we choose a GSM-AMR rate of 4.75 Kbps as an example, each frame is 12 bytes long and includes 20 milliseconds of audio playback. Accordingly, if 30 GSM-AMR frames are encapsulated within a UDP packet, then the UDP packet will contain 360 bytes of data, not including the UDP packet header information. If a single burst error corrupts one of the 30 frames, the remaining 29 frames can be recovered using the techniques described herein. As such, the quality of the audio stream will be significantly improved.

As described above, embodiments of the invention may include various steps. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Figure 5:
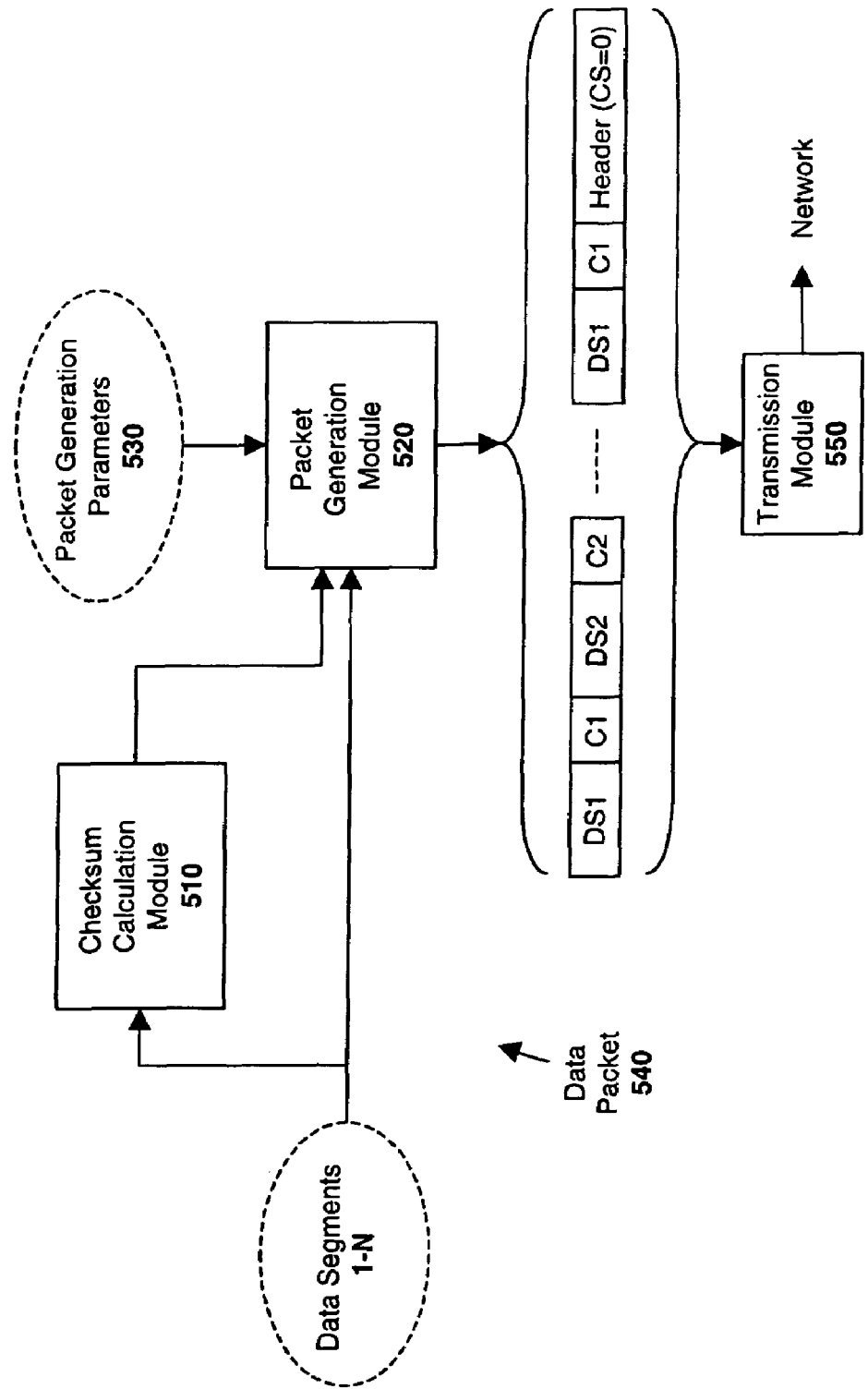
FIG. 5 illustrates an apparatus according to one embodiment of the invention.

One embodiment of an apparatus for processing data packets as described herein is illustrated in FIG. 5. A checksum calculation module 510 calculates checksums for each of a plurality of N data segments. A packet generation module 520 combines the calculated checksums with each of the plurality of data segments and incorporates the checksums and independent data segments within the payload of a data packet 540.

The characteristics of the data packet 540 generated by the packet generation module 520 depend on the specific packet generation parameters 530 programmed into the module. For example, the parameters may define a packet of a particular size to be transmitted to a particular network address. As described above, in one embodiment, the parameters instruct the packet generation module 520 to set the checksum to zero (i.e., thereby effectively turning off the checksum if the data packet is a UDP packet). Various other packet generation parameters may be programmed consistent with the underlying principles of the invention.

A transmission module 550 then implements the remaining networking functions (e.g., at the network, data link and/or physical networking layers) required to deliver the data packet 540 to its destination. For example, if the data packet is a UDP packet, the transmission module may add an IP header to the data packet before sending the data packet over the network.

It should be noted that the various modules and functional parameters illustrated in FIG. 5 may be implemented in software, hardware, firmware or any combination thereof. For example, in one embodiment, the modules are configured in an application-specific integrated circuit ("ASIC"). In one particular embodiment, data packets are generated on a server as described above and transmitted to a personal computer or wireless device (e.g., a PDA, wireless phone, . . . etc).

Throughout this detailed description, for the purposes of explanation, numerous specific details were set forth in order to provide a thorough understanding of the present invention. It will be apparent, however, to one skilled in the art that the system and method may be practiced without some of these specific details. For example, while the embodiments described above focused on UDP, the underlying principles of the invention may be implemented in virtually any packet-switched environment in which packets are discarded. Moreover, while the technique for calculating data integrity described above is the "checksum," various other techniques for calculating data integrity may be employed.

In other instances, well known structures and functions were not described in detail in order to avoid obscuring the subject matter of the present invention. For example, it is presumed that one of ordinary skill in the art understands the basic principles of a layered network environment (e.g., the distinction between networking at the physical layer, the data link layer, the network layer, the transport layer, the application layer, . . . etc). A general discussion of these and other networking principles is set forth in ANDREW S. TANNENBAUM, COMPUTER NETWORKS ($3^{rd}$ Ed. 1996).

Accordingly, the scope and spirit of the invention should be judged in terms of the claims which follow.

What is claimed is:

1. A method comprising:
   receiving, by a personal computer or wireless device, a data packet including a payload, the payload including a plurality of data segments and independent data integrity information for each of the plurality of data segments;
   examining for error a first independent data integrity information corresponding to a first data segment; and
   in response to determining the first independent data integrity information contains an error, individually discarding the first data segment, wherein the individually discarding discards the first data segment while retaining one or more other data segments of the payload of the data packet that do not contain an error.

2. The method of claim 1, wherein the first independent data integrity information is a checksum.

3. The method of claim 1, wherein the data packet further includes a header having a disabled data integrity function.

4. The method of claim 1, wherein examining for error comprises:
   calculating a second independent data integrity information for the first data segment; and
   determining if the second independent data integrity information matches the first independent data integrity information.

5. The method of claim 1, further comprising:
   when the first independent data integrity information contains an error, requesting retransmission of the first data segment.

6. The method of claim 1, wherein examining comprises examining in a network layer above a transport layer.

7. The method of claim 1, wherein the network layer is an application layer.

8. The method of claim 1, wherein the data packet is a User Datagram Protocol ("UDP") packet.

9. The method of claim 1, wherein the first data segment is a Global System for Mobile Communications-Adaptive Multi Rate (GSM-AMR) audio frame.

10. A system comprising:
   a server comprising:
      a checksum calculation module to calculate a checksum for each of a plurality of independent data segments,
      a packet generation module, connected to the checksum calculation module, to encapsulate within a payload of a data packet the plurality of data segments and corresponding checksums, and
      a transmission module, connected to the packet generation module, to transmit the data packet; and
   a personal computer or wireless device, connected to the server, to receive the data packet and individually validate each checksum calculated for each of the plurality of independent data segments within the payload of the data packet, wherein the personal computer or wireless device is further to discard a particular data segment that includes an error and to retain one or more other data segments of plurality of data segments within the payload of the data packet that do not contain an error.

11. The system of claim 10, wherein the packet generation module includes a parameter to set a checksum field in a header of the data packet to zero.

12. The system of claim 10, wherein the wireless device is selected from the group consisting of: a Personal Digital Assistant (PDA), and a wireless phone.

13. The system of claim 10, further comprising:
   a packet-switched network connecting the first apparatus to the second apparatus.

14. An apparatus comprising:
   a processor;
   means for receiving a data packet including a payload, the payload including a plurality of data segments and independent data integrity information for each of the plurality of data segments;
   means for examining for error a first independent data integrity information corresponding to a first data segment; and
   means for discarding the first data segment in response to determining the first independent data integrity information contains an error, wherein the means for discarding is configured to discard the first data segment while retaining one or more other data segments of the payload of the data packet that do not contain an error.

15. The apparatus of claim 14, wherein the first independent data integrity information is a checksum.

16. The apparatus of claim 14, wherein the data packet further includes a header having a disabled data integrity function.

* * * * *